April 25, 1961 B. L. MEYER 2,981,853

REFERENCE PULSE GENERATION

Filed Dec. 4, 1959 2 Sheets-Sheet 1

INVENTOR

BRUCE L. MEYER

BY Cushman, Darby & Cushman

ATTORNEYS

April 25, 1961 B. L. MEYER 2,981,853

REFERENCE PULSE GENERATION

Filed Dec. 4, 1959 2 Sheets-Sheet 2

INVENTOR

BRUCE L. MEYER

BY Cushman, Darby & Cushman

ATTORNEYS

United States Patent Office 2,981,853

Patented Apr. 25, 1961

2,981,853

REFERENCE PULSE GENERATION

Bruce L. Meyer, Bloomington, Minn., assignor to Sperry Rand Corporation, New York, N.Y., a corporation of Delaware Filed Dec. 4, 1959, Ser. No. 857,464

13 Claims. (Cl. 307—88.5)

This invention relates to the generation of electrical time reference pulses in response to a varying input signal representing, for example, digital data. Such pulses may be used for accurately detecting, at a receiving station, the information in the input signal which may have been transmitted from a remote station.

In many present day systems a digital computer is utilized to perform bookkeeping functions previously performed manually. As an example, one such system is an airlines reservation system wherein a computer determines availability of passenger space on the various scheduled flights and assigns reservations to the flights when available. In such a system, a single central computer must receive information from and transmit information to a plurality of remote agent stations. Therefore communication, via radio link or wire transmission, must be maintained between the computer and remote stations.

Pulse modulation is one of the means employed to transmit the digital data information. At the transmitting station a carrier frequency is modulated by the data which is in the form of a rectangular voltage pulse. The digital data is fed serially into the modulator; that is, each data pulse is followed timewise by another pulse of data adjacent thereto. The data bit rate, as fed into the modulator, is constant so that all of the data pulses are of equal widh. The modulated carrier wave is then transmitted via radio link or over wire to the remote receiving station. Upon receipt, the signal is demodulated so that the data is again in the form of rectangular pulses, and the data is then fed serially into the computer in pulse form. Each bit of data must be sensed or detected as it is fed into the computer to determine its value.

Various factors, such as transmission line characteristics, noise, and "keying losses" during modulation, affect the data transmission in a manner to cause time shifting, commonly referred to as "jitter," in the data so that each data bit at the receiving station will not be exactly in time coordination with the corresponding bit from the transmitting station. A means must be provided to obtain a timing base so that detection of the data will be facilitated by synchronization with the incoming bit rate. In this invention said timing base, more commonly referred to as a clock synchronizer, is developed from the data pulses as received. However, where a series of adjacent bits are identical so that no apparent pulse occurs and the received signal appears as a steady state value, or where transmission interruptions occur, the clock synchronizer pulses are derived from a fixed frequency source. The pulses derived from such source must be coordinated timewise with the synchronizing pulses developed from the data pulses and must be locked in phase with the latter so that the output signal of the synchronizer remains at a fixed frequency despite apparent gaps in the data flow.

Therefore, it is an object of this invention to provide apparatus for producing detection pulses in synchronism with digital data pulses.

It is a further object of this invention to minimize the effect of data pulse jitter on the synchronized detection pulse A further object of the invention is to provide synchronized detection pulses during gap periods wherein the data appears as a steady state value or wherein the data is momentarily interrupted.

Another object of this invention is to maintain the synchronizing pulse frequency during the aforementioned gap periods.

Other objects and advantages of this invention will become obvious to those having ordinary skill in the art by reference to the following detailed description of an exemplary embodiment of the apparatus and the appended claims. The various features of the exemplary embodiment may be best understood with reference to the following drawings, wherein:

Since by far the most popular digital signalling systems are those based on binary numbering systems and since the operational description of this invention is facilitated without detracting from the completeness and accuracy by limiting the description to binary systems, the following description will be so limited. However, it should be understood that the workings and teachings of this invention are not limited to such use. This invention can be used in any system which requires derivation of a synchronizing signal from an input signal, and all the advantageous features of this invention will thereby be achieved.

Figure 1:
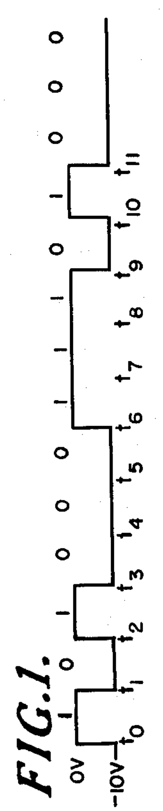
Figure 1 shows an exemplary series of digital data which is to be transmitted.

Figure 1 shows a typical sample of digital data, in electrical pulse form, which may emanate from a machine at a remote location and which must be transmitted to the receiving station. Time is measured along the horizontal line and voltage magnitude in the vertical direction. Since in binary systems the only numbers used are "1" and "0," it is arbitrarily selected that when the voltage is positive, zero volts in the illustration, a "1" is present, and when at −10 volts, a "0" is present, no limitation thereto intended. If an arbitrary bit repetition rate of 1000 bits per second is used, each bit of data will be 1 millisecond in width and the numerical data to be transmitted, from time $t_0$ to time $t_{11}$ will be, in time sequence, 10100011101, with the leftmost bit first in time.

Figure 2:
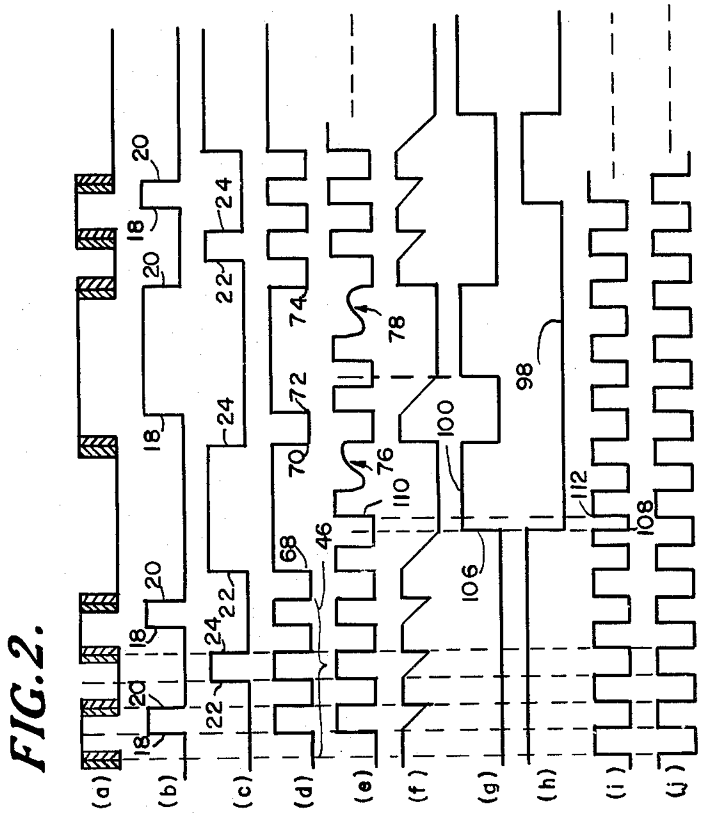
Figure 2 shows idealized waveforms at various points in the signal synchronizer of Figure 3.

Figure 2(*a*), shows the same series of binary data after it has been demodulated at the receiving station. The shaded areas at times $t_0$, $t_1$, $t_2$, $t_3$, $t_6$, $t_9$, $t_{10}$ and $t_{11}$ indicate that due to noise, transmission line characteristics, and/or "keying losses" as previously mentioned, the demodulated received data pulses will not necessarily be in exact time coordination with the original data pulses shown in Figure 1, although the overall bit repetition rate is the same. Because of the susceptibility of the data pulses to such "jitter" or time shifting, it is essential that the detection of each bit of data, i.e., the determination whether a bit is a "1" or a "0," must be made at a time that is essentially in the center of the pulse. Also, since the time sequence may be important in coding techniques, the detection signal must be synchronized to the input data.

Figure 3:
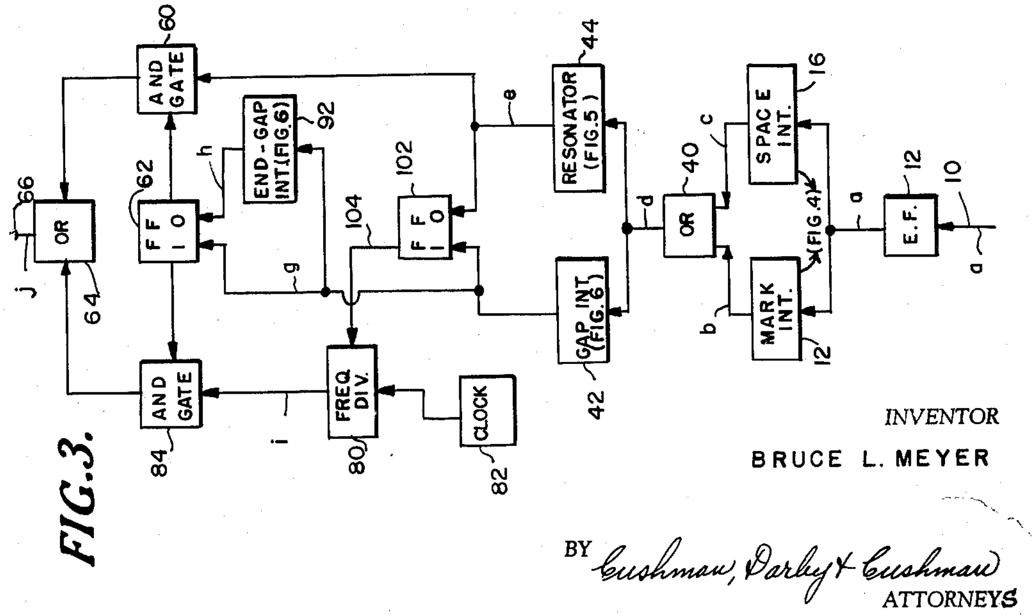
Figure 3 is an exemplary embodiment of this invention showing the signal synchronizer in block diagram form.

The data in the form of Figure 2(*a*), is fed serially into the signal synchronizer of Figure 3 via line 10 to an impedance matching device 12, such as an emitter follower, the output of which follows two parallel paths respectively to a mark integrator 14 and a space integrator 16. Since device 10 serves solely as an impedance matcher, the output therefrom will be essentially identical, in shape, to the input signal of Figure 2(*a*). In commonly used communications terminology, a mark corresponds to the presence of a positive pulse whereas a space indicates no pulse. Analogizing this to binary data as above arbitrarily defined, a mark is the same as a "1" while a space is a "0."

Functionally, the circuits of the mark and the space integrators are identical. In the mark integrator, a positive-going signal, which would be the leading edges of the mark or "1" pulse, is integrated while the trailing negative-going edge is unaffected. The output of the integrating circuit per se is fed into a pulse shaping circuit later described with relation to Figure 4. The combination of integration and shaping results in an output, Figure 2(*b*), of a positive rectangular pulse for each mark pulse input, with the leading edge 18 thereof displaced in time, equal to approximately one-half the time duration of a data bit, from the leading edge of the mark pulse, and the trailing edge 20 in time coincidence, except for negligible internal time delay, with the trailing edge of said mark pulse. Using the arbitrary bit repetition rate of 1000 bits per second previously mentioned, since each bit has a time duration of 1 millisecond, the leading edge of each positive pulse on the output of the mark integrator will be displaced approximately 0.5 millisecond from the leading edge of the data mark pulse, while the trailing edge will be in time coincidence with the trailing edge of said mark pulse. The space integrator performs a like function on a negative-going signal, which is the leading edge of the space or "0" pulse. The output, Figure 2(*c*) of the space integrator, after the pulse has been shaped, consists of a positive pulse for each leading edge of a space pulse, with the leading edge 22 of each positive pulse displaced, as described above, from the leading edge of the space signal and the trailing edge 24 in time coincidence with the trailing edge of the space signal. It should be noted that the trailing edge of a space is the same as the leading edge of a mark while the leading edge of a space is the trailing edge of a mark.

Figures 4, 6:
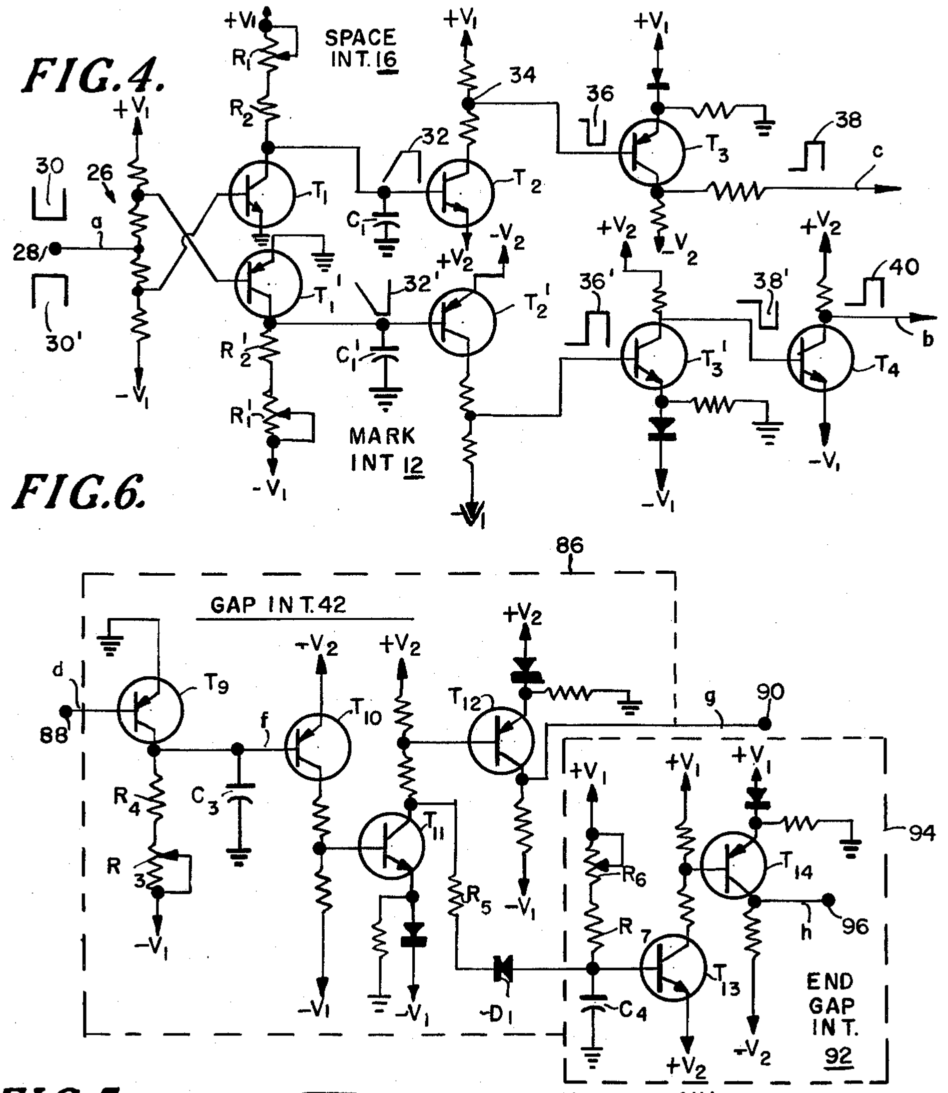
Figure 4 is an exemplary circuit diagram of the mark and space integrator sections of the synchronizer.
Figure 6 is an exemplary circuit diagram of the gap integrator and the end gap integrator sections.

The mark and space integrators and shapers are shown in Figure 4. The output of the emitter follower 10 of Figure 3 is fed in Figure 4 to voltage divider 26 through input terminal 28. Transistor $T_1$ is an npn type and transistor $T_1'$ is a pnp type. The values of the resistors forming voltage divider 26 and the potentials $+V_1$ and $-V_1$ connected thereto are selected so that a positive going pulse will cause transistor $T_1$ to conduct and $T_1'$ to cut off, while a negative-going signal will cause $T_1$ to cut off and $T_1'$ to conduct. Since the two circuits are identical in principle, a description of the operation of one circuit will suffice to explain the operation of both, the only difference being that the designation of pulse polarity in one circuit is the opposite of that of the other circuit. The exemplary negative-going space pulse 30, by cutting off conduction of transistor $T_1$, causes capacitor $C_1$ to charge towards $+V_1$ through series resistors $R_1$ and $R_2$. The charging rate is determined by time constant of $(R_1+R_2)C_1$. Resistor $R_1$ is variable so that the time constant can be manually varied depending on the preselected bit rate. Capacitor $C_1$ thereby performs the integration of the leading edge of the space signal. Since transistor $T_2$ is an npn type with the base element connected to the ungrounded terminal of $C_1$, when $C_1$ charges up to a value slightly more positive than the emitter potential of $+V_2$, transistor $T_2$ conducts, thereby clamping the potential on capacitor $C_1$ at $+V_2$ volts. The resulting integrated and clamped waveform on capacitor $C_1$ is shown by signal 32. The $(R_1+R_2)C_1$ time constant is adjusted so that the charging rate of $C_1$ is such that the voltage thereon rises to a value of $+V_2$ in a time equal to approximately one-half the bit pulse width. Since transistor $T_2$ conducts only while the potential on its base element, which is the voltage charge on capacitor $C_1$, is at $+V_2$, the pulse seen at point 34, which is in the collector circuit of $T_2$, will be equal in width to the flat horizontal portion of pulse 32. The pulse 36 thereby shaped into a rectangular pulse, inverted from the pulse 32 and delayed in time from the leading edge of input pulse 30. Transistor $T_3$ serves the purpose of more shaping and inverting to result in a positive-going pulse 38. Waveforms 30' through 38' show the equivalent waveforms derived from a mark signal through the mark integrator. Transistor $T_4$ is required solely to invert pulse 38' to obtain a positive-going pulse 40. The mark and space integrator output pulses 38 and 40 corresponding to the received data pulses of Figure 2(*a*), are shown in Figures 2(*b*) and 2(*c*) respectively.

In the OR circuit 40 (Figure 3), the two aforementioned signals are combined to achieve the output shown by Figure 2(*d*). The output of OR circuit 40, which may be of the diode type, is positive when either input is positive. The waveforms of Figure 2(*b*) through Figure 2(*d*) are exemplary of a single series of data and do not show the "jitter" present in the input signal of Figure 2(*a*), but it should be understood that such jitter is still present at the output of OR circuit 40 which feeds another integrator 42, termed a "gap" integrator, and a resonator 44.

The resonator is made up of an emitter follower stage, a series resonant circuit, a pulse shaping stage, and a positive feedback path. The resonant circuit is tuned to a frequency corresponding to the data bit rate, assumed herein to be 1000 c.p.s. for explanatory reasons, and is a high Q circuit so that once oscillations begin they are damped out slowly upon removal of the energizing pulse. The pulses of Figure 2(*d*) fed into the resonator, impart energy to the resonant circuit to sustain its oscillation. When the input data signal consists of alternate marks and spaces, as for example in the first three bits of Figure 1, the resultant input to the resonator has a waveform in which the cycle time is equal to the bit width. That is, from time $t_0$ to time $t_3$, shown as 46 by bracketing in Figure 2(*d*), three cycles of pulses occur corresponding to the time of the first three bits of input data in Figure 2. Since a bit repetition rate of 1000 bits per second has been assumed, the frequency to which the resonant circuit in the resonator is tuned, the pulses will impart maximum energy to the tuned circuit when they have a corresponding cyclic frequency.

Figure 5:
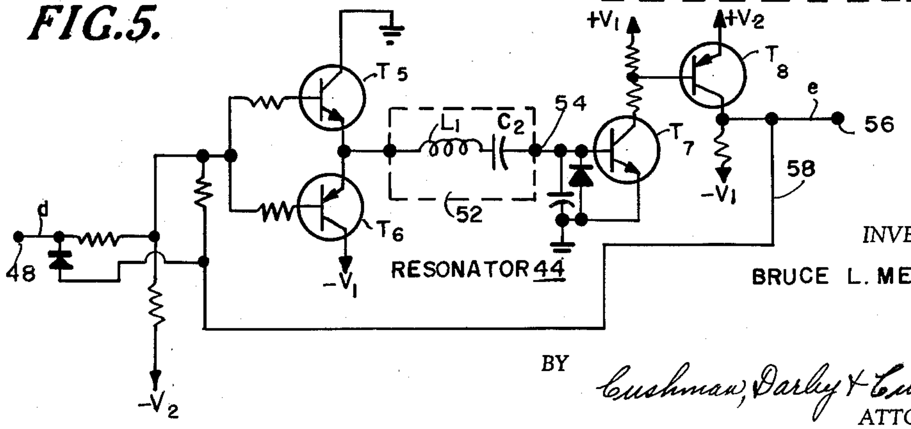
Figure 5 is an exemplary circuit diagram of the resonator section of the synchronizer.

The circuit of the resonator is shown in Figure 5. The output (Figure 2(*d*)) of OR circuit 40 (Figure 3) is fed into the resonator circuit at terminal 48 (Figure 5) and is applied to the base elements of transistors $T_5$ and $T_6$, which transistors comprise an emitter follower circuit. Transistor $T_5$ is an npn type and transistor $T_6$ is a pnp type. The pulses appearing at the common emitter output junction 50, are applied to a tuned circuit 52 including a serially connected inductance $L_1$ and condenser $C_2$. As previously mentioned, the values of $L_1$ and $C_2$ are selected to tune the circuit to the desired resonant frequency, herein using 1000 c.p.s. Once oscillations begin, the incoming pulses will sustain the oscillations and the output of the tuned circuit is shaped by transistors $T_7$ and $T_8$. It should be remembered that the input pulses to the resonator are subject to the same "jitter" of the data input signal of Figure 2(*a*). It is in the resonator that the jitter is substantially eliminated. Because of the "jitter," the incoming pulses are not exactly in time synchronization with oscillations of the tuned circuit. However, as described thoroughly in "Vibration Problems in Engineering" by S. Timoshenko, D. Van Nostrand Co., Inc., 1937, pages 14–19, energy will be imparted by the incoming pulses to sustain the oscillations. The "jittering" of the input pulses received at terminal 48 is therefore averaged out by the tuned circuit and a substantially stable 1000 c.p.s. signal appears at its output terminal 54. This signal is then shaped by transistors $T_7$ and $T_8$ and the waveform of Figure 2(*e*) appears at the resonator output terminal 56. Feedback line 58 aids in eliminating from the resonator input the effects of circuit noise and stray signal coupling.

The output signal Figure 2(*e*) of resonator 44 is fed in Figure 3 to AND circuit 60 which is normally gated by the "0" setting of flip-flop 62 to allow the pulses through to the output OR circuit 64. When that flip-flop is so set, the resonator output appears as the output, at terminal 66, of the signal synchronizer and may be utilized as a synchronized detection signal.

Referring to Figure 2(*d*) during the periods of time between times indicated by 68 and 70 and between times 72 and 74, the signal into the resonator is a steady state value because the input data consists of adjacent bits of the same binary value. It is during these gap periods that the oscillations in the resonator tend to damp out since no energy pulses are fed into the tuned circuit to sustain oscillations. Although the tuned circuit is a high Q circuit, the exemplary waveform of Figure 2(*e*) shows, at 76 and 78, how the ouput signal of the resonator may be affected by damping during such gap periods. In order to maintain a fixed frequency and constant waveform output from the synchronizer circuit, the synchronizer output at terminal 66 must come from another source, frequency divider 80 (Figure 3), during the gap periods.

Crystal oscillator 82 may be any standard type, well known in the art, which is designed to oscillate at a fixed frequency, for example 64 kc. s. The output of the crystal oscilaltor is fed into frequency divider 80 which may be a six stage binary counter. As will be subsequently described in more detail, the output of the divider is a series of rectangular pulses at a frequency of 1 kc. s. The output of the divider goes to OR circuit 64 via AND circuit 84. Flip-flop 62 gates AND circuit 84 but the flip-flop normally is in a state to disable that AND circuit, thereby preventing the signal from the divider from entering OR circuit 64. However, gap integrator 42, which receives the same signal input as resonator 44, detects any gap in the input signal such as would eventually cause a defective resonator output signal as exemplified at points 76 and 78 in Figure 2(*e*), and then causes flip-flop 62 to change states so that the output from divider 80 is gated to OR circuit 64 via AND circuit 84. At the same time, flip-flop 62 disables AND circuit 60 thereby preventing the resonator output from reaching OR circuit 64.

The portion of Figure 6 enclosed by dashed line 86 is the circuit diagram of an embodiment of the gap integrator 42. The pulses of Figure 2(*d*) which are fed into resonator 44, are also fed into the gap integrator at input terminal 88, which is connected to the base element of pnp transistor $T_9$. When the base is more positive than the emitter, which is at ground, transistor $T_9$ will cut off, allowing capacitor $C_3$ to charge towards $-V_1$ through resistors $R_3$ and $R_4$. The charging rate is determined by the $(R_3+R_4)C_3$ time constant. $R_3$ is variable to allow adjustment of the charging rate. Since the ungrounded side of capacitor $C_3$ is connected to the base element of pnp type transistor $T_{10}$, when capacitor $C_3$ charges to a voltage slightly more negative than $-V_2$, the emitter potential of transistor $T_{10}$, that transistor will conduct thereby transmitting a positive pulse to the base element of transistor $T_{11}$. Further shaping of this pulse is performed by transistor $T_{12}$ and the output pulse appears at point 90.

The waveshape of the signal at the base element of transistor $T_{10}$ is shown by Figure 2(*f*). For descriptive purposes, assume that it is desired to switch the output from the resonator to the frequency divider whenever a gap duration equal to one bit pulse width or greater appears in the Figure 2(*d*) waveform, such as starting at times 68 and 72. As will be explained in greater detail hereinbelow, resistor $R_3$ in Figure 6 must be adjusted so that the voltage on capacitor $C_3$ will reach a value slightly more negative than $-V_2$ when the resonator output, Figure 2(*e*), is at a steady state value. That is the voltage charge should not reach $-V_2$ in time coincidence with the negative-going or positive-going edge of a resonator output pulse. When the voltage on capacitor $C_3$ reaches a value slightly more negative than $-V_2$, transistor $T_{10}$ will conduct causing amplifying and shaping transistors $T_{11}$ and $T_{12}$ to conduct which will result in a pulse output at terminal 90, the positive-going leading edge of which indicates the presence of a gap of aforementioned width. Figure 2(*g*) shows the signal waveshape occurring at terminal 90, the gap integrator output. Note that the positive-going leading edge of each positive-going pulse in Figure 2(*g*) is not in time coincidence with any positive-going or negative-going edge of the resonator output, Figure 2(*e*). Although the foregoing describes the operation in detecting a gap of duration equal to or greater than one bit pulse width, it should be understood that if desired, the design of the integrator and adjustment of $R_3$ may be such that only gaps of greater duration will be detected. This will depend on the damping effect on the resonator output. If the resonant circuit in the resonator will maintain oscillations and a good output pulse with greater gap durations, the gap integrator can be designed and adjusted to generate a pulse only upon the occurrence of such greater gaps. However, under any condition, the leading edge of the gap integrator pulse output should not be in time coincidence with a positive- or negative-going edge of the resonator output pulses.

The negative-going pulse signal appearing on the collector element of transistor $T_{11}$ (Figure 6) is also fed to the end-of-gap integrator 92 (Figure 3), the circuit diagram of which is shown in Figure 6 enclosed by dashed line 94, via resistor $R_5$ and diode $D_1$, thereby discharging condenser $C_4$ quickly to nearly the supply voltage $-V_1$ connected to the emitter of transistor $T_{11}$. This cuts off transistor $T_{13}$ which raises the base of transistor $T_{14}$ to $+V_1$ cutting off that transistor to effect a negative-going pulse at output terminal 96 as shown by the first negative-going leading edge in Figure 2(*h*). The next following positive-going signal at the collector of transistor $T_{11}$, which signal is in time coincidence with the end 70 of the gap, is effectively integrated by blocking conduction through diode $D_1$ and allowing capacitor $C_4$ to charge towards $+V_1$ through resistors $R_6$ and $R_7$. When capacitor $C_4$ charges up to a value slightly higher than the supply voltages $+V_2$ connected to the emitter of transistor $T_{13}$, that transistor will conduct pulling the base voltage of transistor $T_{14}$ down sufficiently to cause transistor $T_{14}$ to conduct and provide a positive-going output signal indicative of an end-of-gap. Because of the delay due to charging capacitor $C_4$, no end-of-gap signal will appear at the output of the end-of-gap integrator immediately upon the termination of a gap. This is to allow a period of time to insure that the resonator output has recovered to the proper level before allowing it to provide the synchronizer output. If two gaps are close enough to prevent capacitor $C_4$ from charging sufficiently to cause transistor $T_{13}$ to conduct, as is the case indicated by the two positive-going pulses in Figure 2(*g*), the end-of-gap signal will not occur until after the end of the later occurring gap. The output at terminal 96 of the end-of-gap integrator for the case described is shown in Figure 2(*h*) with the positive-going trailing edge of pulse 98 being the end-of-gap signal.

With reference to Figure 3 again, the output of gap integrator 42 is fed to the "1" input of flip-flop 62, while the output of end-of-gap integrator 92 is fed to the "0" input of flip-flop 62. Flip-flop 62 is of any standard type such that if it is in the "1" state, a positive pulse to the "0" input is required to cause it to change states. If it is in the "0" state, only a positive pulse to the "1" input will cause it to change states.

Assume flip-flop 62 is in the "0" state to gate the output of resonator 44 through AND gate 60 into OR circuit 64 and to maintain AND gate 84 disabled. When a positive pulse, indicative of the beginning of a gap, is generated by gap integrator 42 it causes flip-flop 62 to change to the "1" state, thereby disabling gate 60 and enabling gate 84 to allow the output of frequency divider 80 into OR circuit 64. As shown by Figure 2(*g*), the output of gap integrator 42 will change perhaps several times following its initial positive-going leading edge, but such changes will not affect the state of flip-flop 62, as explained hereinabove. However, when end-of-gap integrator 92 transmits a positive-going pulse, indicative of a desired end-of-gap signal, to the "0" input of flip-flop 62, that flip-flop will switch back to its original "0" state so that the output at terminal 66 will consist of the resonator output.

To review briefly to this point, it has been shown how "jittering" input data pulses are utilized to produce a substantially stable time reference signal from a resonator when there are no gaps in the data signal. It has also been shown how gaps are detected and how the reference signal is maintained, from a fixed frequency source, during such gaps, and how the output is switched back to the resonator when those gaps terminate.

Since the fixed frequency source, crystal clock 82, functions independently of the incoming data signal, the output of the frequency divider 80 can be at any point in a cycle when a gap is detected. That is, without phasing equipment, for example of the type hereinafter described, there is no time coordination between the frequency divider output and the resonator output. This is best seen by noting the exemplary signal output of frequency divider 80 as shown by Figure 2(*i*), and comparing it timewise to the resonator output in Figure 2(*e*). Such a comparison shows that up to the time that a gap is detected, i.e., to the first positive pulse in Figure 2(*g*), the frequency divider output can be as much as 180° out of phase with the resonator output. Since the output at terminal 66 (Figure 3) is switched from the resonator to the frequency divider when positive pulse 100 of Figure 2(*g*) is generated by the gap integrator, and since the output of the resonator is at a negative level while the frequency divider output would be at a positive level at the switch-over time, the output at terminal 66 would be adversely affected. Prevention of this is described in the next succeeding paragraphs.

The frequency divider may essentially be a six bit binary counter including six bistable flip-flops of any type well known in the art which will change states upon receipt of a positive pulse. As is standard in most flip-flops, two outputs are available, the voltage level at each of the outputs being dependent on the state of the flip-flop. Each flip-flop stage is fed directly from the crystal oscillator output, with that output being gated into each stage by ANDING the "1" outputs of the lower order stages. A detailed description of an exemplary embodiment of a binary counter which can be used as a frequency divider is contained in "Arithmetic Operations in Digital Computers" by R. K. Richards, Van Nostrand Co., Inc., 1955, pages 193–196, especially Figure 7–3. The highest order flip-flop will go through one complete cycle for every 64 cycles of the crystal oscillator. Since the crystal oscillator output has a frequency of 64 kilocycles, the output of the highest order flip-flop will be at a frequency of 1 kilocycle. The latter constitutes the clock pulse output of frequency divider 80 (Figure 1) which is gated to OR circuit 64 via AND circuit 84.

Referring to the previous description of gap detection through use of gap integrator 42 and to the waveforms of Figure 2(*g*), for exemplary purposes it has been shown that the design and adjustment of the gap integrator is such as to cause it to generate pulse 100 with its leading edge occurring at a time when the resonator pulse output is at a negative level. As previously described, pulse 100 indicates the presence of a gap and is utilized to switch the output terminal 66 from the resonator output to the frequency divider output. In order for the output at terminal 66 to appear as a symmetrical fixed frequency signal, the output of the frequency divider must also be at a negative level at the time of switch-over and must be able to change to the positive level at the same time as the resonator output so changes. This is accomplished by use of flip-flop 102 in Figure 3.

Flip-flop 102 may be identical to flip-flop 62 the operation of which is described hereinabove. An output signal from flip-flop 102 appearing on disable line 104 sets all the stages in the frequency divider to a "1" condition and holds them at this level as long as the disabling or resetting signal from flip-flop 102 lasts. Removal of the signal from the disable line allows the next subsequent cycle of the crystal oscillator to reinitiate the count in the frequency divider. Since the frequency divider is essentially a binary counter, when all stages are at a "1" the next subsequent count switches all stages to a "0" and the counting resumes.

Normally, when the output at terminal 66 is derived from the resonator, flip-flop 102 is caused to be in an arbitrarily defined "0" state and no disabling signal appears on line 104. An input pulse to flip-flop 102 from gap integrator 42, and particularly the leading edge 106 (Figure 2(*g*)) of pulse 100 causes the flip-flop to change states thereby putting a signal on disable line 104 which sets the frequency divider to a given condition, as explained in the next preceding paragraph. At the same time the output at terminal 66 is switched from the resonator output to the frequency divider output as previously explained. Since the resonator output at the time of switch-over is at a negative level, the output of the frequency divider is preselected to be a negative level. It should be understood that if the gap integrator had been adjusted so that pulse 100 would occur at a time when the resonator pulse is at a positive level, the output of the frequency divider would be preselected to also be at a positive level. Since pulse 100 from the gap integrator via flip-flop 102 forces the highest order stage (as well as the other stages) of the frequency divider to the "1" state, the output of the frequency divider will be forced to and maintained at a negative level, as shown at 108 in Figure 2(*i*). The leading edge of next subsequent positive-going pulse from the resonator, which in this case would be edge 110 in Figure 2(*e*), sets flip-flop 102 back to the "0" state resulting in removal of the disabling signal from line 104 which in turn allows the count to be reinitiated in the frequency divider. As previously described, the next cycle from the crystal oscillator, after the disable signal is removed, switches the six stages in the frequency divider to "0" and then continues the counting. Therefore the output from the last stage, which is the frequency divider output, switches from a negative to a positive level, as seen at 112 in Figure 2(*i*), and then continues under control of the crystal oscillator to produce a one kilocycle signal.

By close analysis it can be seen that there may be a time delay between the removal of the disable signal and the switching of the frequency divider stages from "1's" to "0's." The maximum possible delay is approximately equal to one crystal oscillator cycle. Since this amount is only $\frac{1}{64}$ of an output cycle, its effect is negligible. Of course, depending on the amount of delay allowable, the frequency divider can be made up of more or fewer stages with a corresponding change in crystal clock frequency. For example, if it were desirable to limit the amount of aforementioned delay to 1/128 of an output cycle, a seven stage frequency divider would be used with a 128 kilocycle crystal oscillator.

The output of the digital signal synchronizer at terminal 66 of Figure 3, consisting of the combined outputs of the frequency divider and the resonator, is shown by Figure 2(*j*). The positive-going edge of each pulse is essentially in the center of the data pulses of Figure 2(*a*) as described hereinabove and that leading edge may then be utilized to detect the status of the digital data signal.

There are two important factors to note in regard to the utilization and operation of the above described invention:

First, it might appear that once the output signal is derived from the frequency divider, there would be no apparent reason to switch back to the resonator output. However, it should be noted that the gaps which occur, during which the frequency divider provides the output reference signal, may be due to interruptions in the data transmission as well as to consecutive data bits of the same level. If the gap is due to the former, when transmission is reinitiated the synchronization between the data signal and the frequency divider signal is no longer assured. Therefore, the resonator which derives its output from the input data bits, must be the means of providing the output reference signal.

The second factor is that it is unnecessary to resynchronize when switching the output from the frequency divider back to the resonator because, as indicated above, the output of the resonator is derived from the input data.

Thus it is apparent that there is provided by this invention systems in which the various objects and advantages herein set forth are successfully achieved.

Modifications of this invention now described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. Apparatus for generating electrical time reference pulses in response to an input signal varying at least between two levels comprising means for integrating the positive-going and negative-going excursions of the input signal between said two levels and providing a series of pulses the leading edges of which respectively occur while the input signal is unchanging as between said two levels and the trailing edges of which are in time coincidence respectively with changes of the input signal from one of said levels to the other, resonating circuit means for producing output pulses in response to the pulses from the integrating means and in phase therewith, the pulses from said integrating means being regularly recurring while the input signal varies from either one of said two levels to the other substantially at the end of each one of predetermined time intervals, there being a substantial gap between pulses from the integrating means when the input signal remains away from one of its two levels for a time longer than said predetermined interval, means for providing a series of clock pulses of the same frequency and phase as the said output pulses from said resonating circuit means, an output terminal, and means for connecting the output terminal to receive the output pulses from said resonating circuit means in response to regularly recurring pulses from the integrating means and alternately to receive said clock pulses when a substantial gap occurs between the pulses from said integrating means.

2. Apparatus as in claim 1 including means for integrating the pulses from the first mentioned integrating means to provide a first output signal indicative of the beginning of a substantial gap and a second output signal indicative of the end of at least one of such substantial gaps, and gating means respectively responsive to said first and second output signals for alternately passing the output pulses from said resonating circuit means and said clock pulses to said output terminal.

3. Apparatus as in claim 2 wherein the means for providing a series of clock pulses includes a clock pulse source and a frequency divider the output of which provides said clock pulses of the same frequency and phase as the resonating circuit means output pulses, said frequency divider being of the counter circuit type for counting pulses from said clock source and resettable to a given condition during which no such pulses can be so counted, until the divider is again enabled, and means responsive to each of said first output signals for resetting said frequency divider momentarily and to each of given output pulses from the resonating circuit means for enabling said divider to count pulses again and provide said in phase clock pulses.

4. Apparatus for generating electrical time reference pulses in response to an input signal varying between two levels comprising means for integrating the leading edge of each positive-going excursion of the input signal and providing a series of first pulses having their trailing edges in time coincidence with the trailing edges of corresponding positive-going input signal excursions, means for integrating the leading edge of each negative-going excursion of the input signal and providing a series of second pulses having their trailing edges in time coincidence with the trailing edges of corresponding negative-going input signal excursions, means for interleaving said first and second pulses, resonating circuit means responsive to the interleaved pulses for producing corresponding output pulses in time coincidence therewith while the interleaved pulses regularly recur, and at least one output pulse and the leading edge of another, in the same time and phase relationship with each other and with said output pulses as the output pulses have relative to one another, when the interleaved pulses cease recurring regularly due to the input signal remaining away from one of its two levels for longer than a predetermined time, an output terminal, first gating means for gating when enabled the output pulses from said resonating circuit means to said output terminal, means for providing a series of clock pulses of the same frequency as the said output pulses from said resonating circuit means, second gating means for gating when enabled the clock pulses to said output terminal, means for integrating the leading edge of each interleaved pulse and providing an output signal each time the interleaved pulses cease recurring regularly as aforesaid with the leading edge of each such output signal occurring between the corresponding said leading edge of said another output pulse from the resonating circuit means and the output pulse next preceding that leading edge and with the trailing edge of each output signal being in time coincidence with the next level change of the input signal, means responsive to the leading edge of each of said output signals and to the said corresponding leading edge of said another output pulses from said resonating circuit means for causing the clock pulses to be in phase with the said resonating circuit means output pulses, means for integrating the trailing edge of each of said output signals to provide second output signals having trailing edges respectively occurring only when at least one of said first and second pulses occur following cessation of regularly recurring interleaved pulses as aforesaid, and means responsive to the trailing edges of said second output signals and to the leading edges of the first mentioned output signals for respectively alternately enabling said first and second gating means.

5. Apparatus as in claim 4 wherein said clock pulse providing means includes a clock pulse source and a frequency divider coupled to the output thereof to provide said clock pulses of the same frequency as the said resonating circuit means output pulses, said frequency divider being of the counter circuit type for counting the pulses from said clock source and being resettable to a given condition, said means for causing the clock pulses to be in phase with the said resonating circuit means output pulses being effective in response to the leading edge of each of the first mentioned output signals to reset the frequency divider to said given condition, and responsive to the said corresponding leading edge of each of the said another output pulses from the resonating circuit means to allow the frequency divider to change from said given condition and resume counting of the pulses from said clock source.

6. Apparatus as in claim 4 wherein the resonating circuit means includes a series inductance-capacitance circuit which is tuned to the frequency of the regularly recurring interleaved pulses and which is capable of maintaining a given number of oscillation cycles after cessation of such regularly recurring interleaved pulses for a predetermined time to effect the said at least one output pulse and the said leading edge of another.

7. Apparatus as in claim 4 wherein the first and second mentioned integrating means substantially simultaneously cause integration of the respective input signal excursions and respectively include opposite type transistors with a condenser coupled to the output thereof, said condensers having a time constant which allows charging to a predetermined voltage within substantially one-half the period of time normally occupied by the input signal as it varies between said two levels at its fastest rate, each of the first and second integrating means further including means for shaping the output voltages from said condensers to substantially square wave form, and means for causing the output pulses from each of the integrators to be of like polarity.

8. Apparatus as in claim 4 wherein the third mentioned integrating means includes a transistor having a condenser connected to its output with the time constant of said condenser being such that it obtains a predetermined voltage charge only if the said input signal remains at one of its said two levels for a time greater than the maximum cycling time thereof between the two levels, a transistor coupled at its input to said condenser and operative to conduct current only while the charge on said condenser is at least said predetermined potential for providing a substantially square wave output, and wherein the fourth integrating means includes a second condenser responsive to the leading edge of said square wave output for discharging the condenser and to the trailing edge of said square wave output for charging the second condenser to a predetermined value, the time constant related to the second condenser being such that it reaches said predetermined value only after a time following a trailing edge of one of the first mentioned output signals which time is at least as long as the maximum cycling time of the input signal between its said two levels, and transistor means coupled to the second condenser for effecting a square wave output in response to the discharge of the second condenser and the charge thereof to said predetermined value.

9. Apparatus as in claim 4 wherein the means for alternately enabling the gating means includes a flip-flop having two outputs respectively coupled to said gating means and two inputs respectively coupled to receive said first and second output signals respectively from the third and fourth mentioned integrating means.

10. Apparatus as in claim 4 wherein the first and second pulse interleaving means includes an OR circuit.

11. A digital signal synchronizer for generating time reference pulses in response to a digital signal varying between "1" and "0" states with each digit period having a basic duration subject to variance timewise for extraneous reasons and with the input signal remaining at a given level for successive digits of the same state, comprising means for integrating the leading edge of each positive-going excursion of the input signal to provide a series of first pulses having their leading edges substantially midway between the leading and trailing edge of the corresponding digit period and their trailing edges in time coincidence with the corresponding digit period terminations, means for integrating the leading edge of each negative-going excursion of the input signal to provide a series of second pulses having their leading edges substantially midway between the leading and trailing edges of corresponding digit periods, and their trailing edges in time coincidence with the corresponding digit period terminations, means for causing the first and second pulse series to be interleaved, resonating circuit means including a tuned circuit tuned to the digit period frequency of said input signal for producing output pulses in time coincidence with the said interleaved pulses while the interleaved pulses regularly recur due to recurrent cycling of the input signal between its "1" and "0" states, and for producing at least one additional output pulse and the leading edge of another, in the same time and phase relationship with each other and with said output pulses as the output pulses have relative to one another, when the interleaved pulses cease recurring regularly due to the input signal staying at one of its two levels for at least a full cycle time, an output terminal, first gating means for gating when enabled the output pulses from said resonating circuit means to said output terminal, a clock pulse source, a frequency divider coupled to the output of said source for effecting pulses of the same frequency as the said output pulses from said resonating circuit means, second gating means for gating when enabled the pulses from said frequency divider to said output terminal, said frequency divider being of the counter circuit type and resettable to a given condition, means including a condenser for integrating the leading edge of each interleaved pulse and providing an output signal each time the interleaved pulses cease recurring regularly as aforesaid, said condenser having a time constant greater than the cycling time of regularly recurring interleaved pulses so that the leading edge of each of said output signals occurs between the corresponding said leading edge of said another output pulse from the resonating circuit means and the output pulse next preceding that leading edge, the trailing edge of each such output pulse being in time coincidence with the next change of state of the input signal, a flip-flop having two inputs one of which is coupled to the output of said integrating means for resetting the frequency divider to said given condition in response to the leading edge of each of said output signals with the other of the flip-flop inputs being coupled to the output of said resonating circuit means for resetting said flip-flop in response to the said leading edge of said another output pulse from the resonating circuit means to enable the frequency divider to again count pulses from said clock source for phase synchronizing the pulses therefrom with the output pulses of the resonating circuit means, means including a second condenser for integrating the trailing edge of each of said output signals to provide a second output signal when the interleaved pulses again begin to recur regularly as aforesaid, said second condenser having a time constant greater than the time constant of the first mentioned condenser, a second flip-flop having two outputs respectively coupled to said first and second gating means for alternately enabling same respectively in response to the trailing edge of each second output signal and the leading edge of each first mentioned output signal, whereby the pulses occurring at said output terminal are of constant frequency and phase as alternately received from said resonating circuit means and said frequency divider.

12. Apparatus for generating electrical time reference pulses in response to an input signal varying in amplitude at substantially a given cyclic rate during at least a certain time comprising means responsive to the input signal for providing one pulse per given amplitude change in the input signal while it is varying at said cyclic rate, means for providing regularly recurring phase shiftable pulses of frequency the same as said cyclic rate, and means coupled to the last mentioned means and responsive to the pulses from said first mentioned means for causing the regularly recurring pulses to be phase shifted if necessary so as to issue from their providing means following said certain time in phase with the immediately preceding pulses produced by the first mentioned means.

13. Apparatus for generating electrical time reference pulses in response to an input signal varying in amplitude at substantially a basic cyclic rate only during certain times, comprising first means responsive to the input signal for providing one pulse per given amplitude change in the input signal while it is varying at said cyclic rate, means resonant to said pulses for providing output signals during a succession of said pulses and for a predetermined time thereafter when the input signal ceases varying at said basic rate, means for providing regularly recurring phase shiftable pulses of the same frequency as the output signals which occur from the resonant means during a said succession, and means responsive to the pulses from the first means and to said output signals for causing the regularly recurring pulses to issue from their providing means between said certain times in phase with the output signals which occurred from the resonant means during a preceding certain time.

No references cited.